United States Patent [19]

Meiser

[11] 3,730,828

[45] May 1, 1973

[54] POSTFORMABLE LAMINATE COMPRISING A BARRIER SHEET OF WOOD FIBER IMPREGNATED WITH FULLY CURED UNPLASTICIZED MELAMINE-FORMALDEHYDE RESIN

[75] Inventor: Kenneth D. Meiser, Dallas, Tex.

[73] Assignee: Plastics Manufacturing Company, Dallas, Tex.

[22] Filed: Mar. 23, 1971

[21] Appl. No.: 127,412

Related U.S. Application Data

[63] Continuation-in-part of Ser. Nos. 535,733, March 21, 1966, abandoned, and Ser. No. 9,456, Feb. 6, 1970, abandoned.

[52] U.S. Cl. ............... 161/258, 156/331, 156/335, 161/257, 161/259, 161/263, 161/413
[51] Int. Cl. ............................................. B32b 27/10
[58] Field of Search ............... 161/257, 258, 259, 161/263, 264, 261, 413; 156/60, 196, 212, 331, 335

[56] References Cited

UNITED STATES PATENTS

| | | | |
|---|---|---|---|
| 3,294,622 | 12/1966 | Wark | 161/264 |
| 2,773,788 | 12/1956 | Magrane et al. | 161/263 X |
| 2,331,446 | 10/1943 | Widmer et al. | 260/69 |
| 2,841,571 | 7/1958 | Wohnsiedler | 260/67.6 |
| 3,372,084 | 3/1968 | Arledter | 162/128 |
| 3,318,760 | 5/1967 | Boenig | 161/263 |
| 3,131,116 | 4/1964 | Pounds | 161/258 |

*Primary Examiner*—Daniel J. Fritsch
*Attorney*—Marshall & Yeasting

[57] ABSTRACT

A laminate which is postformable to an arc of a circle having a radius at least as small as three-fourths inch without cracking or dulling of the surface is produced with a paper barrier sheet of wood fiber impregnated with a fully cured unplasticized malamine-formaldehyde resin by consolidating under heat and pressure a postformable substrate in direct contact with a paper barrier sheet consisting essentially of alpha cellulose impregnated with an unplasticized reaction product of formaldehyde and malamine in a mole ratio from 1.1:1 to 1.8:1. The reaction product has an acidity high enough to compensate for its low formaldehyde content, so as to cause it to become fully cured during the heat-and pressure-consolidation.

5 Claims, No Drawings

POSTFORMABLE LAMINATE COMPRISING A BARRIER SHEET OF WOOD FIBER IMPREGNATED WITH FULLY CURED UNPLASTICIZED MELAMINE-FORMALDEHYDE RESIN

CROSS-REFERENCE TO RELATED APPLICATIONS

This is a continuation-in-part of application Ser. No. 535,733, filed Mar. 21, 1966 and application Ser. No. 9,456, filed Feb. 6, 1970, both of which are now abandoned.

BACKGROUND OF THE INVENTION

1. Field of the Invention

This invention relates to an improved postformable laminate, produced by consolidating under heat and pressure a postformable substrate in direct contact with a decorative barrier sheet providing an attractive outer surface.

In the production of such a postformable laminate, the critical problem is the problem of providing a barrier sheet that will not crack when an attempt is made to postform the laminate.

In the production of flat decorative laminates, for many years the decorative surface sheet has consisted of a sheet of paper impregnated with a melamine-formaldehyde resin, which provides a surface of excellent appearance and durability.

However, it is well known, as pointed out in the prior art patents, that a melamine-formaldehyde resin impregnated paper sheet of the ordinary type which is used as the barrier sheet in flat laminates cannot be used as the barrier sheet in a postformable laminate, because such a barrier sheet would crack during the postforming of the laminate.

2. Description of the Prior Art

Each of the prior patents, like the present invention, is directed to the problem of providing a decorative barrier sheet for a postformable laminate which will not crack when an attempt is made to postform the laminate.

Each of the prior patents explains that an ordinary melamine-formaldehyde impregnated paper sheet, when used as the barrier sheet for a postformable laminate, will crack when an attempt is made to postform the laminate, and each of the prior patents discloses some expedient for preventing the decorative barrier sheet from cracking during the postforming of the laminate.

The expedients for preventing the barrier sheet in a postformable laminate from cracking during postforming which are disclosed in the prior patents are as follows:

a. use of expensive long fibers in the barrier sheet; (H. Arledter U.S. Pat. No. 3,372,084)

b. incomplete curing of melamine-formaldehyde resin in barrier sheet; (Pounds U.S. Pat. No. 3,131,116)

c. addition of water as a plasticizer for the melamine-formaldehyde resin in the barrier sheet; (Wark U.S. Pat. No. 3,294,622)

d. modification of the melamine-formaldehyde resin in the barrier sheet by incorporation of a chemical plasticizer; (Magrane U.S. Pat. No. 2,773,788).

Each of these four expedients tends to minimize cracking of a melamine-formaldehyde impregnated barrier sheet during the postforming of a laminate. However, each of these four expedients has certain serious disadvantages as explained below.

Heretofore it was believed that in order to prevent a melamine-formaldehyde impregnated barrier sheet from cracking during the postforming of a laminate, it was necessary either (a) to use a paper barrier sheet containing a substantial proportion of long fibers, or to use a melamine-formaldehyde resin which was either (b) incompletely cured, or modified by the incorporation of (c) free water as a plasticizer, or (d) a chemical plasticizing agent.

The principal object of the invention is the production of a postformable laminate having a paper barrier sheet of ordinary wood fiber impregnated with a fully cured unplasticized melamine-formaldehyde resin, which is postformable to an arc of a circle having a radius at least as small as three-fourths inch without cracking or dulling of the surface.

a. Disadvantages of Using Long Fibers in the Barrier Sheet

H. Arledter U.S. Pat. No. 3,372,084 states in lines 59-63 of column 8, "All of the fibers yielding good post-formability in papers according to this invention are more expensive than regular cellulosic wood pulp such as alpha, sulphite, or sulfate."

One object of the present invention is to use in a postformable laminate a paper barrier sheet consisting essentially of the inexpensive regular cellulose wood pulp.

H. Arledter U.S. Pat. No. 3,372,084 also states, in lines 58-63 of column 1, "Heretofore post-formability of laminates was limited to laminate thicknesses of 0.045 to 0.050 inch, and bend radii of five-eighths inch or higher, and to achieve this limited goal, special postformable melamine-formaldehyde resins and specific cross-creped corestock inlays were required." These "special post-formable melamine-formaldehyde resins" are the incompletely cured resins and the plasticized resins.

b. Disadvantages of Using an Incompletely Cured Melamine-formaldehyde Resin in the Barrier Sheet Pounds U.S. Pat. No. 3,131,116 discloses a postformable laminate having an incompletely cured melamine-formaldehyde resin in the barrier sheet. It is well known that an incompletely cured melamine-formaldehyde resin is inferior in water-resistance and durability to a completely cured melamine-formaldehyde resin.

In the postformable laminate of the present invention, the melamine-formaldehyde resin with which the barrier sheet is impregnated is fully cured.

c. Disadvantages of Plasticizing the Melamine-Formaldehyde Resin in the Barrier Sheet By Addition of Water Wark U.S. Pat. No. 3,294,622 discloses a postformable laminate in which the melamine-formaldehyde resin impregnated barrier sheet contains an excess of free water, as a plasticizing agent. The excess of free water acts as a plasticizing agent to prevent the barrier sheet from cracking during postforming, but also partially hydrolyzes and degrades the melamine-formaldehyde resin in the barrier sheet. Also, the amount of free water in the barrier sheet would be difficult to control because of the loss of free water by evaporation.

Wark U.S. Pat. No. 3,294,622 states, in lines 9, 10 and 70 of column 4, that the added moisture migrates during the pressing into the impregnated sheets, and that this water imparts improved flow properties to the resins. The December 1946 issue of "Plastics," on page 95 states:

"Because melamine resin treated materials tend to be brittle it may also be necessary, in certain instances, to plasticize the resin treated materials, either by the use of steam or high humidity, or the use of certain chemicals in the resin varnish."

The action of added water in plasticizing melamine-formaldehyde resins is well known, and it is also well known that the use of added water as a plasticizer is disadvantageous in that it partially hydrolyzes and degrades a melamine-formaldehyde resin.

d. Modification of the Melamine-Formaldehyde Resin in the Barrier Sheet By Incorporation of A Chemical Plasticizing Agent The expedient which has been used conventionally in order to prevent the cracking during postforming of a melamine-formaldehyde resin impregnated barrier sheet in a postformable laminate has consisted in modifying the melamine-formaldehyde resin in the barrier sheet by incorporation of a chemical plasticizing agent.

A chemical plasticizing agent which has commonly been incorporated in order to plasticize a melamine-formaldehyde resin with which the barrier sheet of a postformable laminate is impregnated is toluene sulfonamide, which is reacted with melamine and formaldehyde in order to produce a plasticized or modified melamine-formaldehyde resin as described in Magrane U.S. Pat. No. 2,773,788.

The use of other chemical plasticizing agents to modify the melamine-formaldehyde resin with which the barrier sheet of a postformable laminate is impregnated is disclosed in U.S. Pat. Nos. 2,584,177, 2,937,966, 3,067,077, 3,082,180 and 3,194,723. Pounds U.S. Pat. No. 3,131,116 states, in lines 63–73 of column 3:

"Another method practiced by the prior art in preparing post-formable laminates consists of more or less extensively modifying the formaldehyde condensates of melamine used to impregnate the print and overlay members of the assembly. The disadvantage residing in this method is that when an effective amount of the modifier or plasticizer is used in conjunction with the melamine resin, whether the plasticizing is internal or otherwise, there results an inferior degree of heat and chemical resistance associated with the cured products derived from such compositions."

Because of the degrading action of the chemical plasticizing agents with which the melamine-formaldehyde resin in the barrier sheet of postformable laminates has been modified, it is customary to limit the amount of the plasticizing agent so that the resulting laminate is not fully postformable in that the radius of each bend must be kept relatively large in order to avoid cracking of the surface lamination. In this way, a compromise has been struck between poor postformability of the laminate and poor durability of the surface.

In order to show the poor postformability of a conventional postformable laminate in which the barrier sheet is impregnated with a conventional toluene sulfonamide-melamine-formaldehyde resin, such a conventional postformable laminate is used as the control in the examples hereinafter set forth.

SUMMARY OF THE INVENTION

The present invention is based upon the surprising discovery that, contrary to the teaching of the prior art, it is possible to produce a laminate having excellent postformability in which the paper barrier sheet (a) consists essentially of ordinary alpha cellulose wood fiber impregnated with a (b) fully cured, (c) unplasticized melamine-formaldehyde resin, provided that the mole ratio of formaldehyde to melamine used in the melamine-formaldehyde resin is within a certain narrow critical range, and provided that the acidity of the melamine-formaldehyde resin during consolidation under heat and pressure is high enough to compensate for its low formaldehyde content so as to cause it to become fully cured. A laminate produced in accordance with the present invention also has excellent water resistance, chemical resistance and heat resistance.

Critical Range of Formaldehyde-Melamine Ratios

In the practice of the present invention, in order to produce a postformable laminate in which the paper barrier sheet consists essentially of ordinary alpha cellulose wood fiber impregnated with a fully cured unplasticized melamine-formaldehyde resin, it is necessary that the formaldehyde and melamine be reacted in a mole ratio from 1.1:1 to 1.8:1. This narrow critical range is in contrast to the wide ranges of 1:1 to 20:1 disclosed by Widmer U.S. Pat. No. 2,331,446, and 1:1 to 6:1 disclosed by Magrane U.S. Pat. No. 2,773,788. In order to provide a reasonably rapid rate of cure, it is customary to use a molar formaldehyde-melamine ratio of at least 2:1, as described in all of the specific examples of the Widmer and Magrane patents.

The melamine-formaldehyde resin with which the barrier sheet is impregnated in the practice of the invention is very slow curing because of its low formaldehyde content, and would not become fully cured if subjected to ordinary curing conditions during the heat- and pressure-consolidation of the laminate. In the practice of the invention, however, the curing of the melamine-formaldehyde resin with which the barrier sheet is impregnated takes place at an increased acidity, which is high enough to compensate for the low formaldehyde content of the resin and to cause the resin to become fully cured during the heat- and pressure-consolidation of the laminate.

It has been discovered that when the resin with which the barrier sheet is impregnated is a reaction product of formaldehyde and melamine in a mole ratio from 1.1:1 to 1.8:1, and has an acidity high enough to compensate for its low formaldehyde content so as to cause reaction product to be completely cured during the heat- and pressure-consolidation of the laminate, the resulting laminate is unique in that it can be postformed without cracking of the barrier sheet even though the barrier sheet consists essentially of ordinary alpha cellulose wood fiber impregnated with an unplasticized, fully cured melamine-formaldehyde resin. This is a surprising result, because it has been generally accepted for many years, as stated in the prior patents, that a laminate in which the barrier sheet is an alpha cellulose sheet impregnated with an unplasticized, fully cured melamine-formaldehyde resin will always crack when an attempt is made to postform it.

The non-brittleness of the resin with which the barrier sheet has been impregnated in the present laminate is surprising, because the use of higher acidity to compensate for the low formaldehyde content of the resin and to force the resin to cure completely during heat- and pressure-consolidation might have been expected to produce a more brittle resin, whereas the resin in the barrier sheet of the present laminate is actually less brittle in postforming than any unplasticized fully cured melamine-formaldehyde resin heretofore used in the barrier sheet of a postformable laminate.

Control of Acidity in Order to Compensate for Low Formaldehyde Content of Formaldehyde-Melamine Resin in Barrier Sheet In the practice of the present invention, the barrier sheet which is consolidated with a postformable substrate is impregnated with an unplasticized reaction product of formaldehyde and melamine in a mole ratio from 1.1:1 to 1.8:1, having an acidity high enough to compensate for its low formaldehyde content so as to cause it to become fully cured during heat- and pressure-consolidation of the laminate.

In order to determine the proper acidity which is required in order to cause the formaldehyde-melamine reaction product to become fully cured in a particular case, several samples of a laminate are prepared by heat- and pressure-consolidation, the samples being identical except that the acidity of the formaldehyde-melamine reaction product with which the barrier sheet is impregnated is varied. The samples of laminate thus produced are then tested in order to determine what degree of acidity of the formaldehyde-melamine reaction product is required in order to produce a laminate that passes the cure test. The cure test employed is a test of the water resistance of the laminate in accordance with the procedure described in NEMA Standards Publication No. LD-1964, entitled "Laminated Thermosetting Decorative Sheets," section LP2-2.11. In this test, a standard metal cup filled with water is heated until the water boils, a small amount of the boiling water is then poured onto the surface of the laminate, and the cup containing the remainder of the hot water is then immediately placed on the wet surface. After 20 minutes, the laminate is wiped dry and the portion of the laminate which was covered by the cup during the 20-minute period is examined to determine whether or not it has been affected by the water. If no deterioration of the surface is observed, the resin in the barrier sheet is considered to be fully cured.

The above test, which determines whether or not the acidity of the formaldehyde-melamine reaction product with which the barrier sheet is impregnated is high enough to cause the reaction product to become fully cured during the consolidation of the laminate, is used instead of attempting to measure the absolute degree of acidity of the reaction product, because the acidity itself may be affected by various factors such as the acidity of the paper which is impregnated with the reaction product to form the barrier sheet. Also, the pH required to cause the reaction product to cure completely under given conditions of temperature and pressure may vary, depending upon the nature of the substance or substances used to furnish the acidity.

Control of the acidity to cause the complete cure of the formaldehyde-melamine reaction product with which the barrier sheet is impregnated is illustrated by the preparation of the following laminates:

Laminate A

A reaction flask equipped with a thermometer, stirrer and reflux condenser was charged with 126 parts of melamine, 121.5 parts of a 37 percent aqueous solution of formaldehyde, 53 parts of water and enough sodium hydroxide solution to bring the pH of the resulting slurry between 7.8 and 8.2. The slurry was heated for 20 minutes to bring it to reflux temperature, and refluxing was then conducted for an additional period of 30 minutes. The resinous solution was then cooled to room temperature. This solution, which contained an unmodified reaction product of formaldehyde and melamine in a mole ratio of 1.5:1, was used to saturate a sheet of pigmented alpha cellulose paper, and the saturated sheet was then dried for 70 seconds at 255° F. When a sample of the resulting sheet was tested by heating it in a circulating-air oven at 300° F. for ten minutes, it was found to have incurred a weight loss of 5 percent of the weight of the dried impregnated sheet. Accordingly, the volatile content of the sheet was considered to be 5 percent. By comparison with the dry weight of the original sheet, the sample of the impregnated sheet after elimination of volatiles was found to contain 52 percent by weight of the formaldehyde-melamine reaction product. In order to determine the pH level of the formaldehyde-melamine reaction product in the impregnated sheet, a sample of the impregnated sheet was immersed in distilled water for several minutes, and the pH of the distilled water, containing the redissolved reaction product, was found to be 7.0.

A laminate was then prepared by assembling a bottom layer of kraft paper, a second layer of crepe kraft paper which had been impregnated with a conventional postformable phenol-formaldehyde resin, four sheets of ordinary kraft paper impregnated with the same phenolformaldehyde resin, and a top sheet cut from the impregnated sheet prepared as hereinbefore described, containing an unmodified formaldehyde-melamine reaction product in a mole ratio of 1.5:1. The assembly of sheets was placed in a laminating press under a pressure of 1,000 pounds per square inch. After being placed under pressure, the assembly was heated to a temperature between 260° and 265° F., the time required to reach 260° F. being 20 minutes. After the assembly had been held under pressure at a temperature between 260° and 265° F. for 15 minutes, the assembly was cooled to about 140° F. while still under a pressure of 1,000 pounds per square inch. Such cooling was accomplished by passing cold water through jackets provided on the press, and the time required for such cooling was about 20 minutes.

The laminate was then tested for water resistance as hereinbefore described, in accordance with the procedure described in NEMA Standards Publication No. LD1–1964, entitled "Laminated Thermosetting Decorative Sheets," Section LP2–2.11. The surface of the laminate was unaffected by this test, indicating that the acidity of the formaldehyde-melamine reaction product with which the barrier sheet was impregnated was high enough to compensate for its low formaldehyde content, so as to cause the reaction product to become fully cured during the heat- and pressure-consolidation of the laminate.

Laminate B

The procedure used in producing this laminate was the same as the procedure used in producing Laminate A, except that the amount of the 37 percent aqueous solution of formaldehyde was 137.7 parts, the amount of water added to the initial mixture was 29 parts, and the period of refluxing was 15 minutes. The mole ratio of formaldehyde to melamine was 1.7:1. With this mole ratio, the acidity of the reaction product in the impregnated barrier sheet should by such that when a sample of the impregnated sheet is soaked in distilled water it imparts to the distilled water a pH of about 7.5, instead of the pH of 7.0 which was shown by the same test in the preparation of Laminate A. The lower acidity in the present case is desirable because the formaldehyde-melamine reaction product in a mole ratio of 1.7:1 cures more rapidly because of its higher formaldehyde content than the formaldehyde-melamine reaction product in a mole ratio of 1.5:1 which was present in the barrier sheet of Laminate A. The higher pH can be obtained in the present case either by using a more alkaline or more highly buffered cellulosic paper for impregnation with the reaction product to produce the barrier sheet, or by raising the pH of the reaction product slightly by addition of sodium hydroxide before the solution of the reaction product is used to impregnate the paper. The use of this higher formaldehyde-melamine mole ratio is advantageous when the paper to be impregnated is an alkaline paper, because a solution prepared with a lower formaldehyde-melamine mole ratio, if used to impregnate alkaline paper, would require the addition to the solution of an acidic substance to compensate for the lower formaldehyde content and to permit complete cure, and such addition of an acidic substance would tend to reduce the storage stability of the aqueous solution.

Laminate C

Laminate C is produced by a procedure which is the same as that used for producing Laminate A, except that the amount of the 37 percent aqueous formaldehyde solution is 105.3 parts, the amount of water added is 92 parts and the period of reflux is 45 minutes. Also, the solids content of the solution is increased in this case to about 60 percent, by applying a vacuum of 20 inches at the end of the period of refluxing and allowing the solution to boil without application of heat so as to remove about 65 parts of water. The mole ratio of formaldehyde to melamine is 1.3:1. A sample of the paper impregnated with this solution, when soaked in distilled water, should impart to the distilled water a pH between 4.0 and 5.5. This higher acidity is required because the present reaction product, because of its lower formaldehyde content, is slower-curing, and can be obtained by using an acidic paper, or by reducing the pH of the solution of the reaction product before it is used to impregnate the paper. Any desired acid or acidic substance, such as lactic acid or p-toluene sulphonic acid, may be added to the solution of the reaction product in order to increase its acidity.

The term "parts" wherever used herein, means parts by weight.

Preparation of Unplasticized Formaldehyde-Melamine Reaction Product

The term "unplasticized" is used herein to indicate that the formaldehyde-melamine reaction product with which the barrier sheet is impregnated is prepared without the addition of any substance that has an appreciable plasticizing action upon the formaldehyde-melamine reaction product. In prior methods of producing postformable laminates, it has been customary to add modifiers, including water and various other substances, which plasticized the formaldehyde-melamine reaction product, but which also react chemically with the formaldehyde-melamine reaction product and which invariably reduce the water resistance and durability of the surface of the laminate.

In the practice of the present invention, the formaldehyde-melamine reaction product may be prepared by dissolving one mole of melamine in an aqueous solution containing from 1.1 to 1.8 moles of formaldehyde and then refluxing until a solution of the desired viscosity is obtained. The pH of the slurry that is obtained upon addition of the melamine should be about 8. When the mole ratio of formaldehyde to melamine used for the reaction is in the upper part of the range between 1.1:1 and 1.8:1, the total quantity of water in the initial reaction mixture may be slightly less than the weight of the melamine. However, when the mole ratio of formaldehyde to melamine is in the lower part of this range, the quantity of water present in the initial mixture should be substantially greater than the weight of the melamine, in order that a clear or substantially clear solution of the reaction product may be obtained.

As the mole ratio of formaldehyde to melamine used for the reaction approaches 1.8, the benefits obtained in the practice of the invention decrease slightly. On the other hand, as the mole ratio approaches 1.1:1, it becomes more difficult to obtain a clear impregnating solution. The preferred mole ratio of formaldehyde to melamine is from about 1.2:1 to about 1.7:1.

The concentration of an aqueous solution of a formaldehyde-melamine reaction product, prepared as hereinbefore described, may be any concentration that makes it possible to impart the desired amount of the reaction product by impregnating the paper which is to be used to form the barrier sheet of a postformable laminate embodying the present invention. The concentration of the solution may vary from about 30 percent to about 70 percent solids.

If desired, the reaction product may be separated by spray drying, the the spray dried reaction product may be redissolved subsequently in water to prepare an impregnating solution of the desired concentration.

Postformable Substrate

The advantages of a laminate embodying the present invention become evident only when the laminate is postformed, and postforming is possible only when the barrier sheet of paper impregnated with an unplasticized reaction product of formaldehyde and melamine in a mole ratio of 1.1:1 to 1.8:1 is combined with a postformable substrate. The postformable substrate may be prepared in the known manner, for example from sheets of kraft paper impregnated with a postformable phenol-formaldehyde reaction product. The content of the postformable phenol-formaldehyde reaction product in such sheets of impregnated kraft paper usually ranges from about 25 percent to about 35 percent of the weight of the impregnated sheets.

Barrier Sheet

A barrier sheet to be used in a postformable laminate embodying the present invention is prepared by impregnating a sheet of alpha cellulose paper with a solution of an unplasticized reaction product of formaldehyde and melamine in a mole ratio between 1.1:1 and 1.8:1, prepared as hereinbefore described.

If desired, the alpha cellulose paper employed may be a pigmented paper.

The paper to be used for the barrier sheet may be impregnated by means of conventional apparatus. A continuous web of paper may be fed from a supply roll, and may be impregnated by means of coating rolls, or by passing it beneath the surface of the impregnating solution, or by by both means.

After the impregnating operation, the impregnated paper may be dried at a temperature from about 240° F. to about 280° F. for about one minute.

The purpose of the barrier sheet is to provide a decorative surface of satisfactory appearance and durability, which hides the unattractive color of the substrate. Thus the barrier sheet is usually pigmented to increase its hiding power.

Production of Laminate

Postformable laminates are widely used for applications such as the manufacture of counter tops and table tops having contoured edges. These laminates are manufactured originally in the form of flat sheets which are sold to manufacturers of furniture and cabinets. In the manufacture of furniture and cabinets, these laminates are cut to the desired sizes and are postformed wherever bends are required.

A postformable laminate embodying the present invention is prepared from one or two top sheets, and a plurality of sheets which form the postformable substrate and which preferably consist of kraft paper impregnated with a postformable phenol-formaldehyde reaction product as hereinbefore described. The substrate imparts strength and rigidity to the laminate, and the top sheet or sheets provide an attractive and durable surface.

The barrier sheet which overlies the core sheets often is called a "print sheet" because it is customarily printed with a non-bleeding ink in a decorative design, or is pigmented or dyed to produce a uniform color.

The color of the phenol-formaldehyde resin used to impregnate the core sheets in the substrate is poor and is not light fast. Therefor the barrier sheet should be opaque or pigmented to hide the color of the core sheets, and should be impregnated with a sufficient amount of a formaldehyde-melamine reaction product to prevent the phenol-formaldehyde reaction product of the core sheets from bleeding into the barrier sheet.

In order to provide a surface of maximum durability and to protect the barrier sheet against abrasion, an "overlay sheet" is commonly used on top of the barrier sheet in a laminate. When an overlay sheet is used in a postformable laminate embodying the present invention, the overlay sheet consists of alpha cellulose paper impregnated with an unplasticized, fully cured reaction product of formaldehyde and melamine in a mole ratio from 1.1:1 to 1.8:1, prepared as hereinbefore described. Preferably such reaction product constitutes from about 60 to about 70 percent of the weight of the overlay sheet. The overlay sheet is unpigmented so that in the finished laminate the overlay sheet is substantially transparent.

Regardless of whether or not an overlay sheet is used, the barrier sheet is a postformable laminate embodying the invention should consist of alpha cellulose paper impregnated with an unplasticized, fully cured reaction product of formaldehyde and melamine in a mole ratio from 1.1:1 to 1.8:1.

Preferably about 40 to 60 percent of the weight of the barrier sheet consists of a formaldehyde-melamine reaction product. The paper which is impregnated to form the barrier sheet preferably consists of a pigmented, relatively pure, absorbent alpha cellulose paper.

In the production of a postformable laminate embodying the present invention, the assembly of sheets is placed in a laminating press and is subjected to a pressure and temperature of the order usually employed in the production of a high pressure laminate. The usual pressure is from about 800 to about 1,500 pounds per square inch.

While the assembled sheets are held under pressure in the laminating press, they are heated to a temperature between 260° and 270° F. and are held in this temperature range for a curing time ranging from about 10 to about 20 minutes. These conditions effect the complete cure of the formaldehyde-melamine reaction product present in the top sheet or sheets. As the final step, the laminate is cooled under pressure to a temperature of about 140° F.

A typical postformable laminate embodying the present invention has a thickness of about 50 to 60 mils. Of this thickness, the overlay sheet contributes about 2 to 4 mils and the barrier sheet contributes about 5 to 9 mils. The postformable substrate accounts for the remainder of the thickness of the laminate.

A postformable laminate embodying the present invention may be characterized as a "decorative" laminate because of the fact that the surface lamination contains a reaction product of formaldehyde and melamine, which makes it possible for the surface of the lamination to have an attractive and light-fast color.

The operation of postforming a laminate is conducted by heating the laminate along the line of the desired bend to a temperature of about 325° and 350° F., bending the laminate to the desired contour, and then holding the laminate in its bent form while it cools. In this manner it is possible to produce a table top having a contoured edge, or a sink top having a vertical splash shield which forms an unbroken continuation of the sink top.

Postformability

The principal characteristic that distinguishes a laminate embodying the present invention from the postformable decorative laminates heretofore known is that a laminate of the present invention is capable of being postformed to a smaller radius than the postformable decorative laminates heretofore known, without cracking or dulling of the barrier sheet.

At the same time, the barrier sheet in a laminate of the present invention contains an unplasticized, fully cured reaction product of formaldehyde and melamine. For this reason, the durability, water resistance, chemical resistance and heat resistance of a laminate embodying the present invention are superior to those of the postformable decorative laminates heretofore in commercial use, in which the barrier sheet contains a reaction product of formaldehyde and melamine which is either incompletely cured, or is modified by incorporation of a plasticizing agent that is intended to minimize the brittleness of the barrier sheet.

Postformable laminates embodying the present invention, because of their superior postformability, give more satisfactory results in the manufacture of contoured table tops and counter tops than the postformable decorative laminates heretofore available. Also, structures made from the present postformable laminates perform more satisfactorily in use because of the superior durability of the surface of the present postformable laminates. The properties which impart superior postformability to the present laminates make it possible to obtain superior results in various manufacturing operations, such as hot punching, in which the present laminates may be used.

The superior postformability of laminates embodying the present invention is demonstrated by the following examples:

EXAMPLE 1

The postformability of laminate A, embodying the present invention, was compared with the postformability of a conventional postformable laminate heretofore in commercial use. In order to provide an accurate comparison, this conventional commercial laminate was prepared by a procedure which was the same as the procedure used for preparing Laminate A except that, instead of the unmodified reaction product of formaldehyde and melamine in a mole ratio of 1.5:1, the aqueous solution used to produce the impregnated barrier sheet contained a commercial formaldehyde-toluene sulfonamide-melamine reaction product which was of a standard grade conventionally used for the impregnation of the barrier sheet in the production of postformable laminates. The mole ratio of formaldehyde to melamine in this reaction product was between 2:1 and 2.5:1.

The test specimens used for testing postformability consisted of pieces of laminate 2 inches by 8 inches in size, including four pieces cut from Laminate A and four pieces cut from the conventional commercial laminate prepared as hereinbefore described. The method used for testing the postformability of the four specimens of each laminate was the method described in the NEMA Standards Publication mentioned above. The bending jig used for testing postformability by this method had a lower cavity in the shape of a 90° notch. This cavity was provided with interchangeable inserts which determined the radius at the apex of the notch. Four different radii were used for the four specimens cut from each laminate. The bending jig also included a vertically movable member consisting of a 90° wedge arranged to fit in the cavity. The edge of the 90° wedge was slightly rounded. In the testing of each specimen, the specimen was first placed in a standard infra red heater, the potential across the heating elements being 120 volts. In this heater the specimen was located three inches above the heating elements, and was arranged with the barrier sheet facing downward. As the temperature indicator, a standard indicator wax was applied to the back of each specimen. As soon as the wax melted, indicating that the specimen had reached a temperature of 325° F., the specimen was placed in the cavity of the bending jig, with the barrier sheet still facing downward. The movable wedge portion of the jig was then lowered with sufficient force so that the time elapsed between the instant when the wedge came in contact with the back of the specimen and the instant when the barrier sheet came into full contact with the contoured notch was slightly less than 1 second. The specimen was then held under pressure in contact with the contoured notch for one minute in order to allow the specimen to cool.

The results of the postformability tests were as follows:

POSTFORMABILITY OF LAMINATES (15 Minute Cure)

| Post-Forming Radius (inches) | Appearance of surface at bend | |
|---|---|---|
| | Laminate A | Conventional laminate |
| ¾ | Excellent | Excellent |
| ⅝ | Excellent | Excellent |
| 5/16 | Excellent | Cracked |
| 3/16 | Excellent | Cracked |

These results show that the postformability of Laminate A, embodying the present invention, was much better than that of the conventional commercial laminate, in that the barrier sheet of Laminate A did not crack even when Laminate A was post-formed to a radius as small as three-sixteenths inch, whereas the barrier sheet of the conventional commercial laminate was cracked even when an attempt was made to post-form the conventional commercial laminate to a radius as large as five-sixteenths inch.

According to the NEMA Standards Publication which describes the test procedures, a postformable laminate is considered to be of a standard commercial grade if it can be post-formed to a radius at least as small as three-fourths inch without cracking or dulling of the surface. Thus it is evident that the present invention makes possible the attainment of a degree of postformability that is vastly superior to the degree of postformability which has been considered commercially acceptable heretofore.

The conventional laminate which was prepared and tested as heretofore described was a typical example of the type of postformable laminate which has been in commercial use heretofore. In this conventional type of postformable laminate, the barrier sheet is impregnated with a melamine-formaldehyde resin containing a plasticizing agent which, because of its degrading action upon the resin, is used in only a limited amount, so as to strike a balance between poor postformability and poor durability.

Thus Laminate A, in which the barrier sheet was impregnated with an unplasticized, fully cured formaldehyde-melamine reaction product, was not only superior in postformability to the conventional laminate used in the tests, but was also substantially superior to the conventional laminate in water resistance, chemical resistance and heat resistance of the surface formed by the barrier sheet.

Although the water resistance of the conventional laminate used in these tests was substantially less than the water resistance of Laminate A, the barrier sheet of this conventional laminate, containing a plasticized formaldehyde-melamine resin, was found to be fully cured when this conventional laminate was subjected to the cure test, described in the NEMA Standards, Publication, which was used in testing the cure of Laminate A.

EXAMPLE 2

In order to determine the effect of increasing the cure time, another postformable laminate embodying the present invention was prepared in the same manner as Laminate A, except that the period of time for which the laminate was held under pressure at a temperature between 260° and 265° F. was 17 minutes instead of 15 minutes. For purposes of comparison, another conventional laminate was prepared by a procedure which was the same as that used in Example 1 except that the conventional laminate was held at a temperature between 260° and 265° F. for 17 minutes instead of 15 minutes.

Four samples cut from each of these two laminates were then tested for postformability in the manner described in Example 1, with the following results:

POSTFORMABILITY TESTS (17 Minute Cure)

| Post-Forming Radius (inches) | Appearance of surface at bend Laminate A | Conventional laminate |
|---|---|---|
| ¾ | Excellent | Excellent |
| ⅝ | Excellent | Cracked |
| 5/16 | Excellent | Cracked |
| 3/16 | Slightly Cracked | Cracked |

The above results indicate that both types of laminates, which were fully cured in 15 minutes, were slightly overcured in 17 minutes, as indicated by increased brittleness. However, the above results still show that the postformability of the laminate embodying the present invention was greatly superior to the postformability of the conventional laminate, in that the laminate of the present invention was slightly cracked when post-formed at a radius as small as three-sixteenths inch, while the conventional laminate was cracked when post-formed at a radius as large as five-eighths inch.

EXAMPLE 3

In order to determine the effect of decreasing the cure time, an additional laminate embodying the present invention was prepared by a procedure which was the same as the procedure used in preparing Laminate A, except that the time for which the laminate was held under pressure at a temperature between 260° and 265° F. was 13 minutes instead of 15 minutes. For purposes of comparison, a laminate of the conventional type was prepared by a procedure which was the same as the procedure used in preparing the conventional laminate in Example 1 except that the laminate was held under pressure at a temperature between 260° and 265° F. for 13 minutes instead of 15 minutes.

Four samples cut from each of these two laminates were tested for postformability by the test procedure used in Example 1, with the following results:

POSTFORMABILITY TESTS (13 Minute Cure)

| Post-Forming Radius (inches) | Appearance of surface at bend Laminate A | Conventional laminate |
|---|---|---|
| ¾ | Excellent | Dull |
| ⅝ | Excellent | Dull |
| 5/16 | Excellent | Dull |
| 3/16 | Excellent | Dull |

The foregoing results show that Laminate A, embodying the present invention, had excellent postformability even when the cure time was only 13 minutes. The conventional laminate, when cured for only 13 minutes, was incompletely cured and commercially unacceptable under the NEMA Standards, as shown by the fact that the surface of the barrier sheet in the area of the bend became dull upon reheating during the postforming operation.

The laminates prepared in accordance with this example, which were cured for only 13 minutes, were also subjected to the cure test as used for testing the cure of Laminate A, in accordance with the procedure described in the NEMA Standards Publication. In this cure test, no deterioration of the surface of the laminate embodying the invention which had been cured for only 13 minutes was observed, indicating that the formaldehyde-melamine resin in the barrier sheet of that laminate had been fully cured. On the other hand, when the same cure test was applied to the conventional laminate which had been cured for only 13 minutes, the barrier sheet of that laminate became dull and splotchy, indicating that the conventional laminate was definitely undercured when a cure time of only 13 minutes was used.

These results also show that the relative brittleness of the conventional laminate tested in Example 1 was not due to over-curing, because the 13 minute cure employed in Example 3 was insufficient to complete the cure of the conventional laminate, and the 15 minute cure employed in Example 1 was just sufficient to cure the conventional laminate.

These postformability tests on the specimens of the conventional type of postformable laminate show that the limited amount of plasticizing agent which can be used in the conventional type of laminate imparts only marginal postformability. The 15 minute cure time used in Example 1 was just sufficient to cure the conventional type of laminate, but the postformability tests in Example 1 showed that the curing of the conventional type of laminate was accompanied by simultaneous development of brittleness which caused the conventional laminate to crack when an attempt was made to postform it to a radius less than five-eighths inch. This brittleness of the conventional type of postformable laminate is due to the fact that only a limited amount of the plasticizing agent can be incorporated in the resin with which the barrier sheet is impregnated without causing prohibitive degradation of the durability of the conventional type of laminate.

In the production of Laminate A, the acidity of the unplasticized formaldehyde-melamine resin with which the barrier sheet was impregnated was high enough to compensate for its low formaldehyde content so as to force the cure of the resin to completion even when the cure time was only 13 minutes, as shown by the results in Example 3. The formaldehyde-melamine resin with which the barrier sheet of Laminate A was impregnated was remarkably non-brittle and provided excellent postformability whether cured for 13 minutes or for 15 minutes. Even when cured for 17 minutes, the unplasticized formaldehyde-melamine resin in the barrier sheet of Laminate A, although slightly overcured, was still much less brittle than the plasticized formaldehyde-melamine resin in the barrier sheet of the conventional type of laminate tested in Example 1, which had been cured just long enough to complete the cure of the resin.

Thus the results obtained in manufacturing the postformable laminates of the present invention are much more reliable and reproducible than the results obtained in manufacturing the conventional type of postformable laminate heretofore commercially used, because the curing of the laminates of the present invention is a much less critical operation. The results obtained in these examples show that Laminate A, embodying the present invention, has excellent postformability, whether cured for 13, 15 or 17 minutes. In contrast, the postformability of the conventional type of laminate used in Example 1 was very marginal even though that laminate had been cured just long enough to complete the cure of the plasticized formaldehyde-melamine resin in the barrier sheet, using a cure time of 15 minutes. When the cure time of the conventional type of postformable laminate was increased slightly to 17 minutes, as in Example 2, the postformability of the conventional type of laminate was seriously impaired.

I claim:

1. A method of producing a postformable laminate having a paper barrier sheet of wood fiber impregnated with a fully cured unplasticized melamine-formaldehyde resin, comprising the step of consolidating under heat and pressure in a dry state a paper barrier sheet and a postformable substrate in direct contact with the barrier sheet, characterized in that the paper barrier sheet consists essentially of alpha cellulose impregnated with an unplasticized reaction product of formaldehyde and melamine in a mole ratio from 1.1:1 to 1.8:1, having an acidity high enough to compensate for its low formaldehyde content so as to cause it to become fully cured during the heat- and pressure-consolidation, the resulting laminate being postformable to an arc of a circle having a radius at least as small as three-fourths inch without cracking or dulling of the surface.

2. A method according to claim 1 wherein the paper barrier sheet consists essentially of alpha cellulose impregnated with an unplasticized reaction product of formaldehyde and melamine in a mole ratio from 1.2:1 to 1.7:1.

3. A heat- and pressure-consolidated postformable laminate comprising a paper barrier sheet of wood fiber which is impregnated with a fully cured unplasticized melamine-formaldehyde resin and is directly bonded to a postformable substrate, characterized in that the paper barrier sheet consists essentially of alpha cellulose impregnated with an unplasticized reaction product of formaldehyde and melamine in a mole ratio from 1.1:1 to 1.8:1 which has been fully cured during the heat- and pressure-consolidation of the laminate in a dry state at an acidity high enough to compensate for its low formaldehyde content and to permit complete cure, the laminate being postformable to an arc of a circle having a radius at least as small as three-fourths inch without cracking or dulling of the surface.

4. A postformable laminate according to claim 3 wherein the paper barrier sheet consists essentially of alpha cellulose impregnated with an unplasticized reaction product of formaldehyde and melamine in a mole ratio from 1.2:1 to 1.7:1.

5. A postformable laminate according to claim 3 comprising an overlay sheet of paper which is bonded to the barrier sheet and consists essentially of alpha cellulose impregnated with a fully cured unplasticized reaction product of formaldehyde and melamine in a mole ratio from 1.1:1 to 1.8:1.

* * * * *